United States Patent [19]

Kelsey

[11] Patent Number: 4,882,397

[45] Date of Patent: Nov. 21, 1989

[54] METHOD FOR CONVERTING POLYKETALS TO POLYARYLETHERKETONES IN THE PRESENCE OF A METAL SALT

[75] Inventor: Donald R. Kelsey, Houston, Tex.

[73] Assignee: Amoco Corporation, Chicago, Ill.

[21] Appl. No.: 156,844

[22] Filed: Feb. 17, 1988

Related U.S. Application Data

[63] Continuation-in-part of Ser. No. 938,424, Dec. 5, 1986, abandoned.

[51] Int. Cl.$^4$ .................. C08G 2/30; C08G 65/32
[52] U.S. Cl. ............................. 525/471; 528/126
[58] Field of Search ............................. 525/471

[56] References Cited

U.S. PATENT DOCUMENTS 3,734,888  5/1973  Darms ............................. 525/471

FOREIGN PATENT DOCUMENTS 0148633  7/1985  European Pat. Off. ............. 525/471
0994481  2/1983  U.S.S.R. ............................. 525/471

*Primary Examiner*—Earl Nielsen
*Assistant Examiner*—Frederick Krass
*Attorney, Agent, or Firm*—Frederick S. Jerome; William H. Magidson; Ralph C. Medhurst

[57] ABSTRACT

Described herein is process for preparing polyaryletherketones from a polyketal by converting the polyketal to a polyaryletherketone in the presence of a Group IIA, IIB, IVA, VIIB, IIIA, IVB, IB or VIII metal salt.

17 Claims, No Drawings

METHOD FOR CONVERTING POLYKETALS TO POLYARYLETHERKETONES IN THE PRESENCE OF A METAL SALT

REFERENCE TO RELATED APPLICATION

This application is a Continuation-In-Part of U.S. patent application Ser. No. 938,424 filed Dec. 5, 1986, now abandoned.

BACKGROUND OF THE INVENTION

Crystalline polyketones, particularly polyaryletherketones as described in, for example, U.S. Pat. Nos. 3,953,400; 3,441,538 and 4,010,147 are known to exhibit a superior combination of properties, such as high use temperatures, thermal and photochemical stability, and resistance to attack by solvents. These properties are due primarily to the high melting points, generally about 250° C. and higher, and to the crystalline nature of these polymers.

European Patent Application Publication No. 0148633, published Jul. 17, 1985 describes a process for preparing a high molecular weight crystalline polyaryletherketone by forming a polyketal and then converting the polyketal to a polyaryletherketone. The conversion of the polyketals to the polyaryletherketones is described, as conducted in the presence of water and an acid under heterogeneous or homogeneous conditions, on page 43.

Generally, heterogeneous conversion is carried out by treating the polyketal with an excess of water, optionally, in the presence of an organic liquid and dilute acid catalyst. The polyketal is preferably in the form of finely divided particles or a film, either in solid form or in the melt, which are substantially insoluble under the reaction conditions. The weight ratio of water to polymer is preferably from about 1 to about 100, although greater amounts of water can be used. The acid catalyst is used preferably at concentrations of from 0.0001 to about 20 weight percent of the water present and, most preferably, from about 0.005 to about 2 weight percent. Suitable acid catalysts include strong mineral acids, such as hydrochloric acid, nitric acid, fluorosulfonic acid, sulfuric acid and the like, and strong organic acids, such as p-toluenesulfonic acid, trifluoromethane sulfonic acid, and the like.

THE INVENTION

In the present invention, it has been found that polyketals can be converted to polyaryletherketones by the use of a catalyst comprising a Group IIA, IIB, IVA, VIIB, IIIA, IVB, IB or VIII metal salt. No added water is necessary as in the conversion described in European Patent Application No. 0148633, supra, so that the conversion can be carried out in the melt.

The preferred catalysts include $ZnCl_2$, $SnCl_2$, $MgCl_2$ or mixtures thereof. The catalyst is used in amounts of from 0.001 to about 20 percent and preferably from about 0.01 to about 10 percent, based on the weight of polymer.

The present invention comprises converting a polyketal to a polyaryletherketone in the presence of a catalyst comprising one or more of a group IIA, IIB, IVA, VIIB, IIIA, IVB, IB, or VIII metal salt.

The reaction is generally carried out at a temperature of from about 150° to about 400°, preferably from about 250° to about 350° C.

In general, the process of this invention may be carried out in steps in which (a) monomer units—A—are reacted to produce a precursor high polymer [A'] under reaction conditions (i) and then (b), the precursor polymer is further reacted under conditions

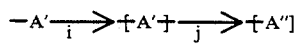

(j) to produce the desired crystalline polymer [A"]. More than one type of monomer unit can be employed, as for example

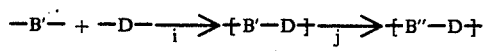

The process is generally characterized by formation of the precursor polymers with high molecular weights which are soluble in the organic solvent used in reaction (i), whereas the crystalline polymers formed after reaction (j) are not soluble under conditions (i) employed in the first step. Conversely, the reaction conditions (i) are such that, generally, if these conditions were employed as a single reaction step using monomer units —A— or —B"— (instead of —A'— or —B'—), the crystalline polymer is insoluble under the reaction conditions and formed in lower molecular weight than obtained using the two-step process. Furthermore, reaction (j) is such that essentially complete conversion of units —[A']— (or —[B']—) to —[A"]— (or —[B"]—) is obtained with little or no polymer chain cleavage or chain crosslinking.

The polyaryletherketones of this invention are prepared from polyketals, which polyketals are prepared from one or more bisphenols of the following formula:

or

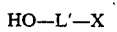

wherein K' is the residue of a substituted or unsubstituted aromatic or heteroaromatic nucleus containing from about 10 to about 40 carbon atoms and also containing at least one backbone difunctional unit of the following formula:

said unit being stable to the basic polymerization conditions employed, wherein G and G' are selected from the group consisting of, —OR, and —OCOR$^1$, wherein R and R$^1$ are each independently alkyl, aryl, or arylalkyl of from 1 to about 20 carbon atoms; R and R$^1$ may be substituted or unsubstituted, may contain heteroatoms, and may also be connected by a chemical bond thus connecting G and G', with the proviso that the R's should not contain functionality which is base sensitive such as hydroxyl; L' is the residue of a substituted or unsubstituted aromatic or heteroaromatic nucleus of from about 10 to about 40 carbon atoms containing at least one electron-withdrawing group ortho or para to X and also containing at least one difunctional backbone unit —C(G)(G')— as defined above and wherein X is a group displaced during the polymerization reaction.

The polyketal is derived from the following:

(a) one or more monomers X—Z—Y, where Z is the residue of a substituted or unsubstituted aromatic or heteroaromatic nucleus of from about 5 to about 30 carbon atoms containing at least one electron-withdrawing group ortho or para to X and Y, wherein X and Y are groups displaced during the polymerization reaction;

(b) optionally one or more bisphenols HO—W—OH, where W is the residue of a substituted or unsubstituted aromatic or heteroaromatic nucleus of from about 5 to about 30 carbon atoms, and (c) one or more compound, HO—K'—OH, wherein K' is as defined above containing the unit —C(G)(G')— wherein G and G' are defined as above and also G and G' are combined.

Preferably the polyketal is derived from the following:

(a) one or more monomers X—Z—Y where Z is

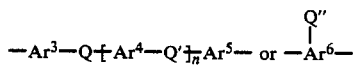

where $Ar^{3-6}$ are substituted or unsubstituted aryl radicals of from about 5 to about 18 carbon atoms, n is 0 to about 3, Q and Q' are electron withdrawing groups ortho or para to X and Y, and selected from the group consisting of —SO$_2$—, —CO—, —SO—, —N=N—, —C=N—, —C=N(O)—, imide, vinylene (—C=C—) and substituted vinylene such as —C=C(CN)—, perfluoroalkyl such as —CF$_2$—CF$_2$—, —P(O)R$^8$—, wherein R$^8$ is a hydrocarbon group, ethylidine (C=CH$_2$), C=CF$_2$, C=CCl$_2$, and the like and Q" is an electron withdrawing group ortho or para to X and Y selected from the group consisting of —NO$_2$, —CN, perfluoroalkyl such as —CF$_3$, —NO, —SO$_m$R$^8$ (m is 1 or 2), or hetero nitrogen as in pyridine and the like; and wherein the displaceable leaving groups X and Y are halogen such as —F and —Cl, —NO$_2$, —OSOR$^8$, —OSO$_2$R$^8$, and the like;

(b) optionally one or more bisphenols HO—W—OH, where W is selected from the following:

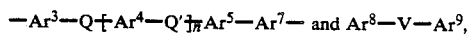

where n, $Ar^{3-5}$, Q, and Q' are as defined above, $Ar^{7-9}$ are as defined for $Ar^{3-5}$, and wherein V is a single bond, —O—, —S—, —S—S— or a difunctional hydrocarbon radical of from 1 to about 20 carbon atoms, such as alkyl, aryl, and alkylaryl radicals and rings fused to both $Ar^8$ and $Ar^9$;

(c) one or more bisphenol monomers HO—K'—OH where K' is selected from

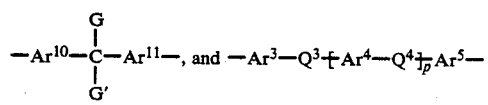

where G, G', and $Ar^{3-5}$ are as defined above, p is an integer of 1 to about 5, $Q^3$ and $Q^4$ are as defined for Q, Q', and V, with the proviso that at least one $Q^3$ and $Q^4$ is the group —C(G)(G')—, and $Ar^{10}$ and $Ar^{11}$ are substituted or unsubstituted aryl of from about 5 to about 18 carbon atoms such as phenylene, biphenylene, and —Ar$^8$—V—Ar$^9$— is as defined above.

Most preferably, the polyketal is derived from the following:

(a) one or more monomers X—Z—Y, where Z is selected from the following:

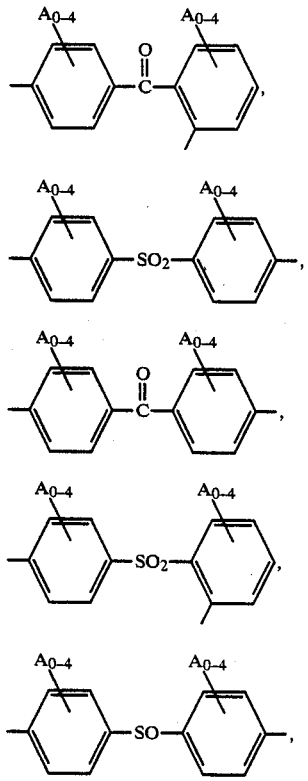

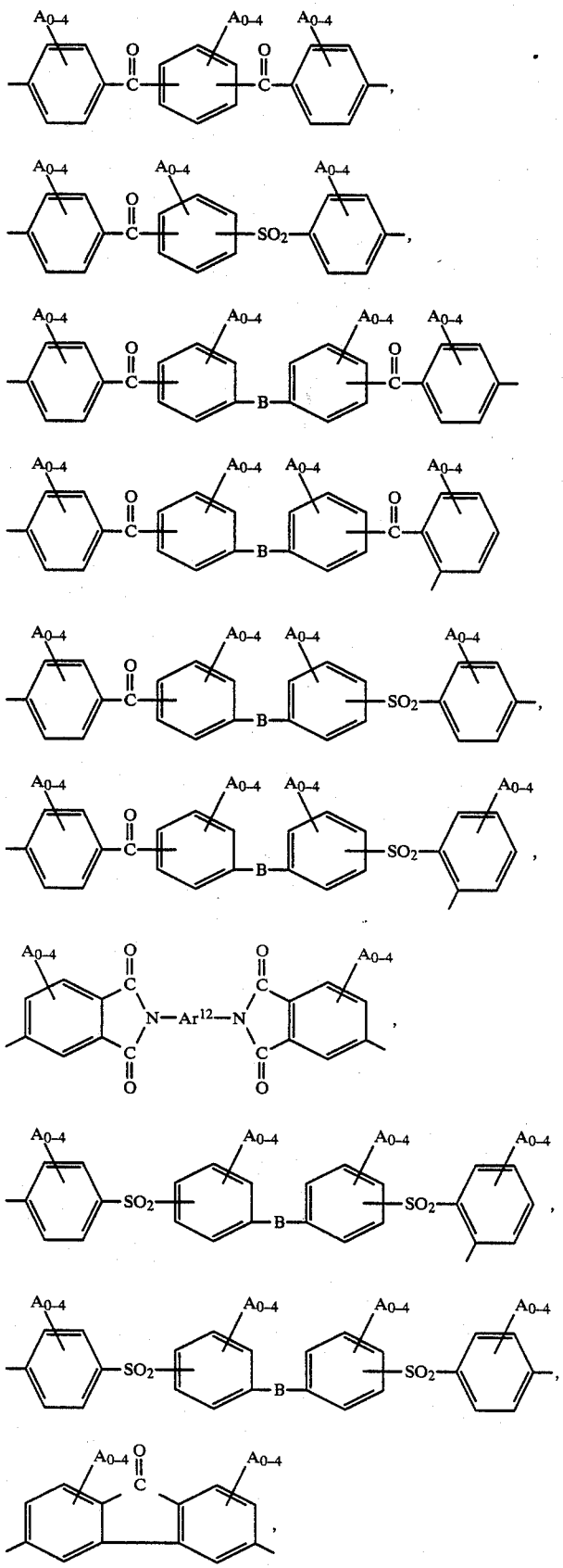

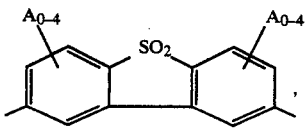

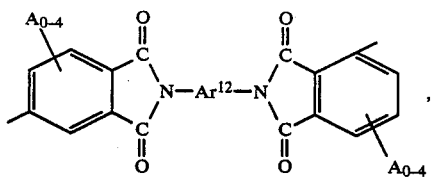

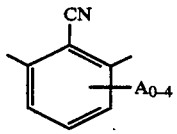

and isomers thereof, and wherein B is defined as above for V, Q, and Q', $Ar^{12}$ is defined as above for $Ar^{1-11}$, and A is a non-interfering substituent group unreactive under the polymerization conditions and independently selected from the group of common organic substituents such as hydrogen, alkyl, aryl, halogen, cyano, and the like, and wherein X and Y are halogen or nitro; and most preferably Z is

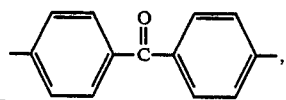

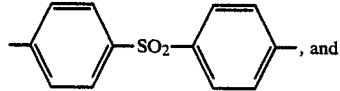, and

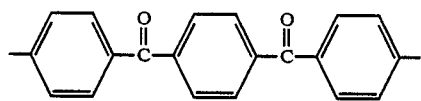

wherein X and Y are F or Cl and A is hydrogen;

(b) optionally one or more comonomer bisphenols HO—W—OH, where W is selected from the following:

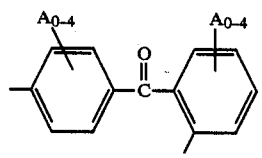

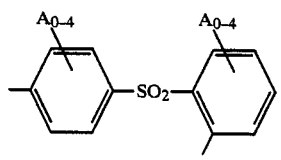

-continued

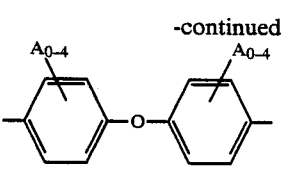

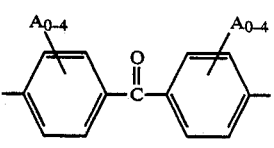

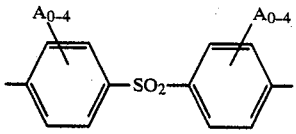

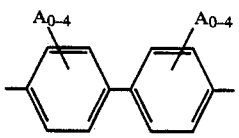

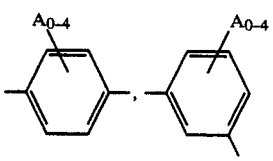

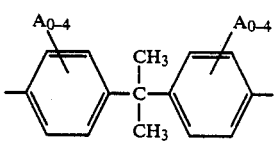

-continued

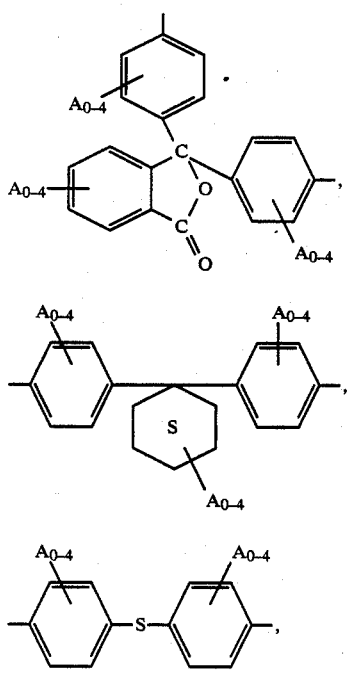

and isomers thereof, and wherein A is defined as above and X and Y are halogen or nitro, and particularly most preferably where W is selected from the following:

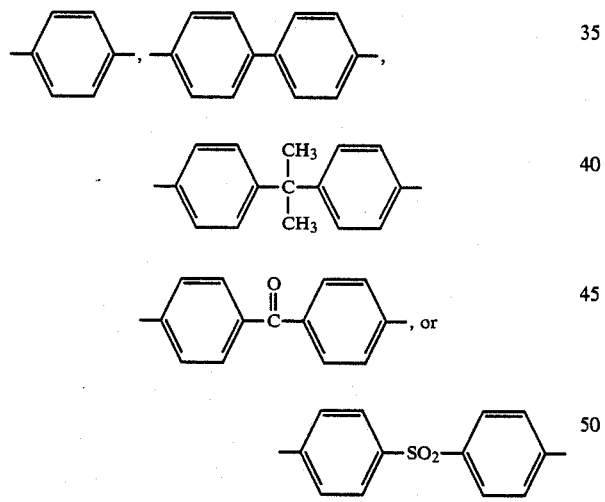

wherein A is hydrogen and X and Y are F or Cl and
(c) one or more bisphenols HO—K'—OH where K' is selected from

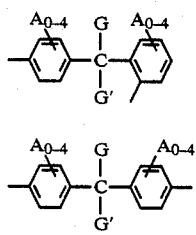

-continued

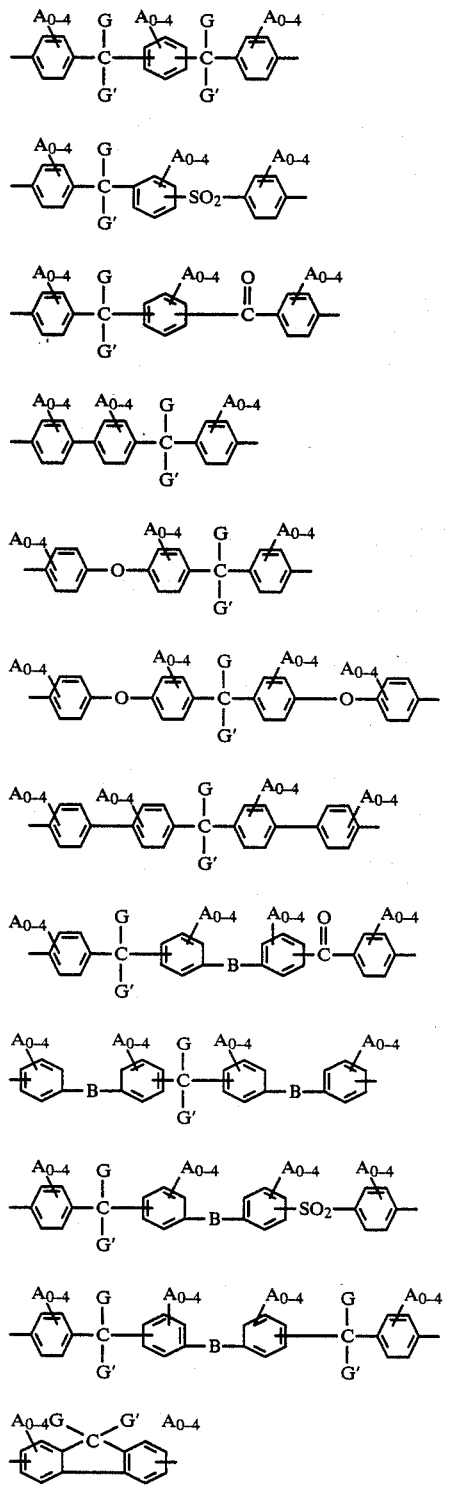

and isomers thereof, and wherein A and B are as defined above, and most preferably the following:

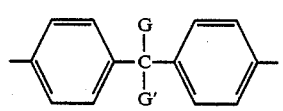

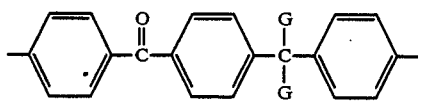

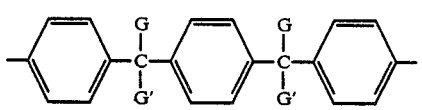

wherein A is hydrogen and G and G' are —OR, wherein R is a substituted or unsubstituted alkyl, aryl, or aryl-alkyl of from 1 to about 20 carbon atoms and may contain heteroatoms or other non-interfering functional groups with the proviso that R should not contain functionality which is base sensitive such as hydroxyl, and G and G' may be the same or different and connected or unconnected.

Examples of R include methyl, ethyl, propyl, isopropyl, benzyl, cyclohexyl, and the like, and where G and G' are connected —CH$_2$CH$_2$—, —CH(CH$_3$)CH$_2$—, —CH(CH$_3$)CH(CH$_3$)—, —C(CH$_3$)$_2$CH$_2$—, —C(CH$_3$)$_2$CH(CH$_3$)—, —C(CH$_3$)$_2$C(CH$_3$)$_2$—, —CH$_2$CH$_2$CH$_2$, —CH$_2$C(CH$_3$)$_2$CH$_2$—,

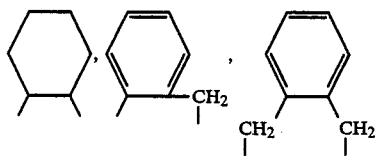

and the like.

The most preferred ketal bisphenol monomers are characterized as having formula (i) or (ii)

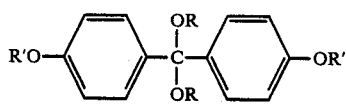

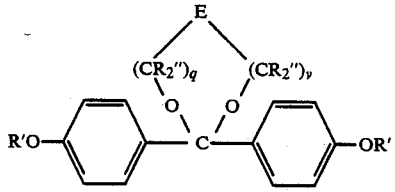

where R is as defined above, R' is hydrogen or —C(O)R''' wherein R''' is substituted or unsubstituted aryl or alkyl group containing 1 to about 20 carbon atoms, R'' is independently selected from the group consisting of hydrogen, alkyl, aryl, arylalkyl containing from 1 to about 20 carbon atoms, substituted or unsubstituted, E is selected from the group consisting of a single bond, double bond, difunctional hydrocarbon, carbonyl, —O—, —S—, —SO—, —SO$_2$—, —NR—, and difunctional silicon, g is 1 or 2, and v is 1 or 2.

The most preferred ketal bisphenol monomers are of the following formula:

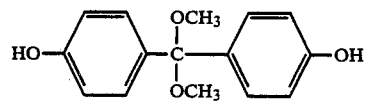

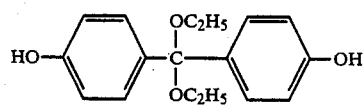

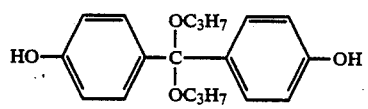

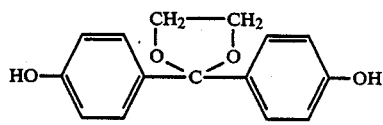

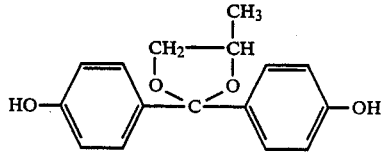

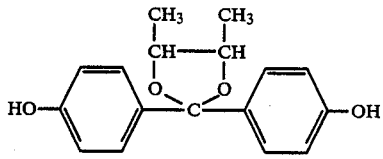

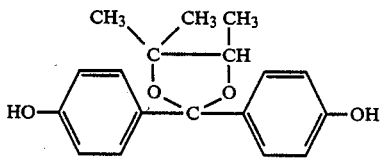

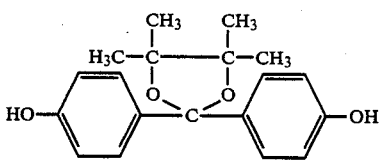

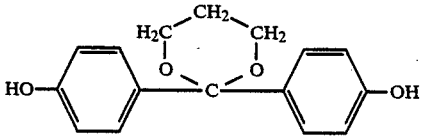

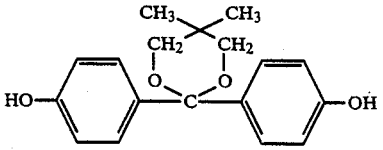

and their corresponding carboxylic acid esters.

Optionally, the polyketal may be derived from one or more of the monomers X—Z—Y, HO—W—OH, and HO—K'—OH or HO—L'—X wherein L' and X are as defined above wherein L' contains the unit —C(G)(G') wherein G and G' are defined above and G and G' are also combined.

Preferred monomers HO—L'—X are those selected from the following

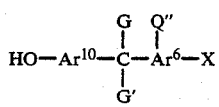

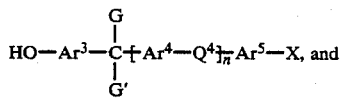

wherein $Ar^{3-6}$, $Ar^{10}$, Q'', G, and G', are as defined above, $Q^4$ is as defined above with the proviso that at least one $Q^4$ is defined as for Q and Q' and is ortho or para to X, $Q^3$ is as defined above with the proviso that at least one $Q^3$ is —C(G) (G'), and n is 1 to about 5, and wherein X is halogen or nitro.

Most preferably HO—L'—X is selected from the following:

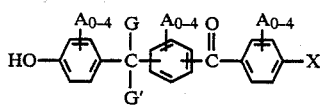

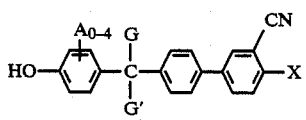

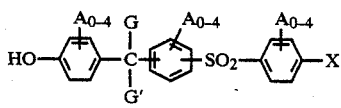

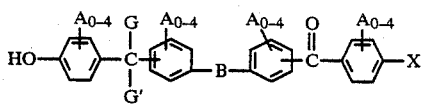

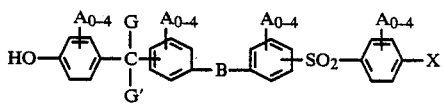

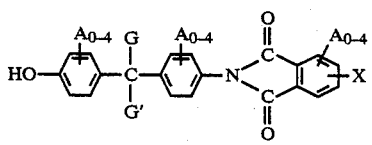

and isomers thereof, and wherein A and B are as defined above and X is F, Cl, or $NO_2$; G and G' are —OR, wherein R is a substituted or unsubstituted alkyl, aryl, arylalkyl of from 1 to about 20 carbon atoms and may contain heteroatoms or other non-interfering functional groups with the proviso that R not contain functionality which is base sensitive, such as hydroxyl, and G and G' may be the same or different and connected or unconnected; and most preferably HO—L'—X is of the following formulae:

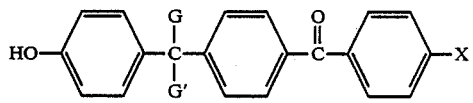

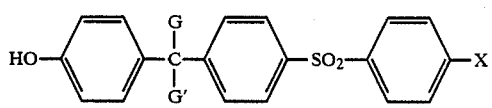

wherein A is hydrogen, X is F or Cl, and G and G' are OR. Examples of ketal halophenol monomers include those of the following formulae:

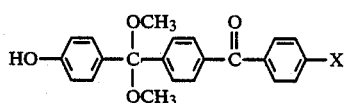

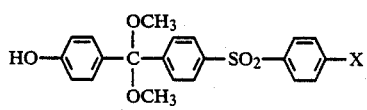

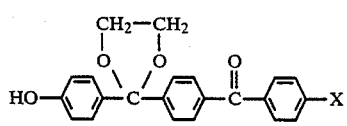

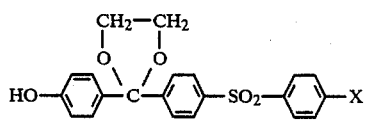

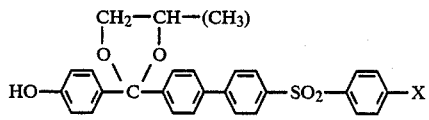

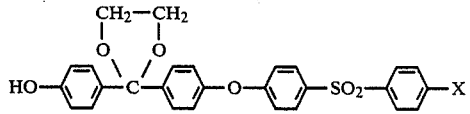

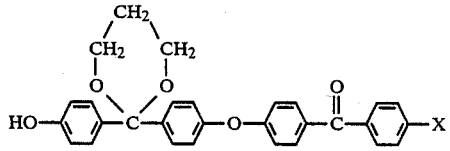

wherein X is F or Cl.

Also, the polyketal may optionally be derived from the halophenol monomer HO—L—X in combination with monomers HO—L'—X or HO—K'—OH, optionally HO—W—OH, and X—Z—Y where L and X are as defined above for L' except that the group —C(G) (G')— need not be present. Preferred halophenol monomers are the following:

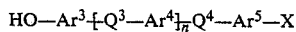

where $Ar^{3-5}$, $Q^3$ and $Q^4$ are as defined for HO—L'—X except that one or more $Q^3$ need not be —C(G) (G')— and n is 0 to 5.

Most preferred monomers include the following:

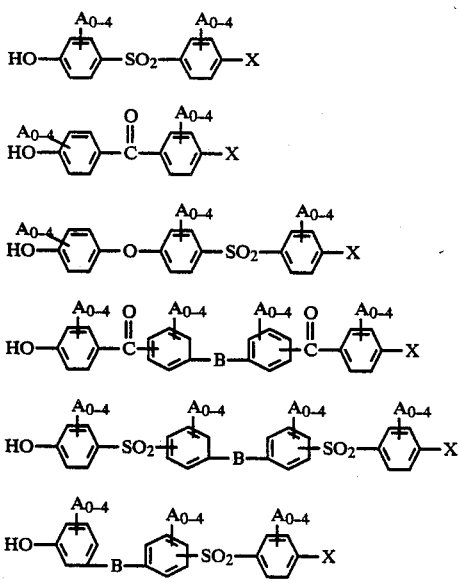

and isomers thereof and wherein A and B are as defined above and X is F, Cl, or nitro; especially preferred are the following:

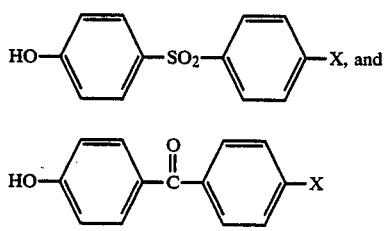

where A is hydrogen, and X is F or Cl.

The polyketals are essentially linear polyethers comprised of the following repeat units:

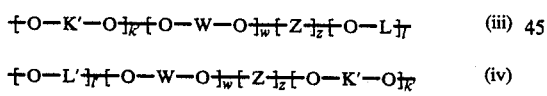

where K', W, Z, L and L' are as defined above in their general, preferred, and most preferred embodiments and wherein k', w, z, l, and l' are the relative mole fractions selected so as to achieve the proper stoichiometric or near stoichiometric ratios for the desired oligomers and polymers. Thus it is obvious to one skilled in the art that the sum of k' and w must closely approximate z whereas the ratio of $z/l'$ or $z/l$ is not critical except that for the polyketals of this invention the mole fraction k' is greater than or equal to 0.01 in (iii) or mole fraction l' is greater than or equal to 0.01 in (iv).

Preferably, the mole fraction k' is greater than or equal to 0.1 in (iii) and l' is greater than or equal to 0.1 in (iv).

The polyketals are generally amorphous when w and l are small in (iii), e.g., when both k' and z approximately equal 0.5 and both w and l approximately equal zero, or when w is small in (iv). It can be readily appreciated by one skilled in the art, however, that in those instances where k' and l' are zero or nearly zero, i.e., by not employing monomers HO—K'—OH or HO—L'—X, and the resulting polymer is crystalline, then the formation of high molecular weight is often more difficult to achieve due to crystallization of the polymer from the reaction medium. In such cases, it may be advantageous to use a sufficient proportion of HO—K'—OH or HO—L'—X so as to maintain polymer solubility in the reaction medium and, in so doing, reduce or eliminate the crystallinity of the polymer.

The most preferred polyketals are those of the aforementioned most preferred monomers, i.e., polymers containing the following structural repeat units:

(V)

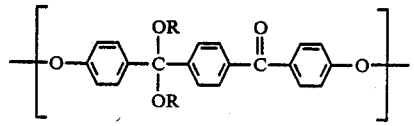

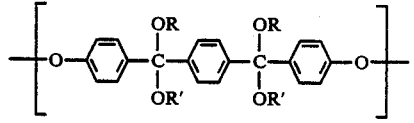

optionally with the following:

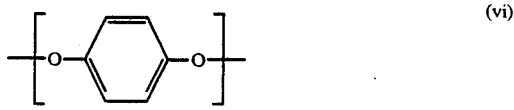

(vi)

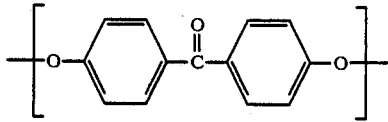

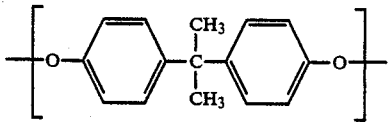

together with the appropriate molar equivalent proportion of the following:

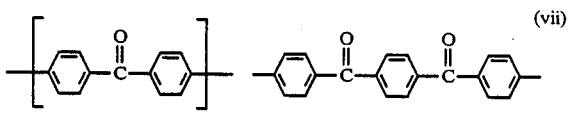

(vii)

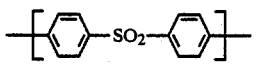

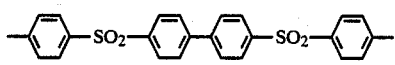

where R is as defined above.

The polyaryletherketones of this invention are essentially linear polymers comprised of the following repeat units:

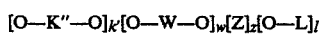

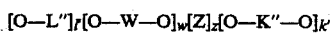

wherein W, Z, L, w, z, l, k' and l' are as previously defined. K" and L" are as defined for K' and L' except that backbone difunctional unit

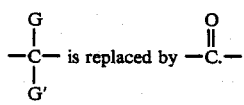

The most preferred polyaryletherketones contain the following structural repeat units:

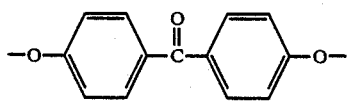

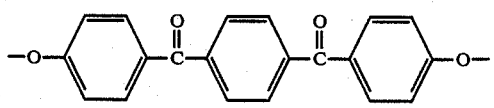

optionally with the following:

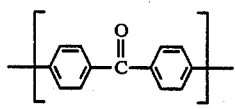

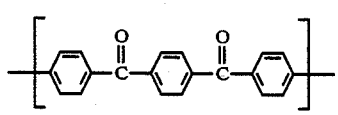

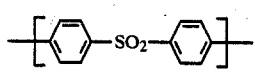

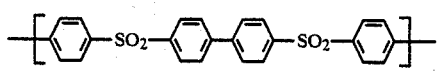

together with the appropriate molar equivalent proportion of the following:

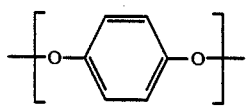

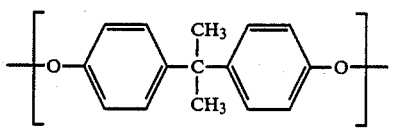

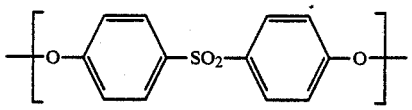

The preferred polyaryletherketones are characterized as possessing a greater degree of crystallinity than analogous polyaryletherketones prepared by either the high temperature process or the borontrifluoride/hydrogen fluoride process of the prior art. This greater degree of crystallinity is evidenced by higher tensile modulii at temperatures of from about 200° C. up to about 350° C., by higher heat of crystallization as measured by differential scanning calorimetry (DSC), and by higher heat of fusion as measured by DSC. Carbon-13 nuclear magnetic resonance spectra obtained on solid polymer samples using cross-polarization and magic angle spinning techniques show relatively narrow resonance bands for polymer prepared according to the process of this invention whereas polymers prepared by the methods of the prior art exhibit broader bands and shoulders which are characterized by less uniform structures.

The process for the preparation of the ketal monomers from the precursor diaromatic ketones containing at least one hydroxyl group ortho or para to the carbonyl comprises reacting the ketone precursor with a glycol in the presence of an alkylorthoester and a solid catalyst.

The precursor ketones are those analogous to the monomers HO—K'—OH and HO—L'—X described herein except that the group —C(G) (G') is replaced by a carbonyl and at least one hydroxyl group is situated ortho or para to said carbonyl.

The glycols, which include the heteroatom analogues such as thioglycols and dithiols, are of the general formula:

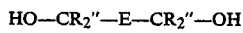

HO—CR$_2$"—E—CR$_2$"—OH wherein R" and E are as defined above, preferably with E being a single bond, and which include ethylene glycol, propylene glycol, 2,3-butanediol, 2-methyl-1,2-propanediol, 2-methyl-2,3-butanediol, 2,3-dimethyl-2,3-butanediol, 1,3-propanediol, 2,2,-dimethyl-1,3-propanediol, and the like.

The alkylorthoesters include trimethyl orthoformate, triethyl orthoformate, trimethyl orthoacetate, triethyl orthoacetate, tetramethyl orthosilicate, tetraethyl orthosilicate, and the like. Readily hydrolyzed compounds such as 2,2-dimethoxypropane, 2,2-dimethyl-1,3-dioxolane, and the like, which form volatile products such as methanol, ethanol, acetone, and the like may be substituted for the orthoester.

The solid catalyst is preferably a finely divided acidic alumina-silica compound, and most preferably a montmorillonite clay as exemplified by the montmorillonite designated K-10 (obtained from United Catalysts). While the montmorillonite clays are preferred, other solid acidic catalysts with high surface areas may also function effectively as catalysts. These include acidic alumina, sulfonated polymer resins, as described in G. A. Olah et al, Synthesis, 282 (1981), and the like.

The reaction is conducted by mixing together the ketone precursor, about one equivalent, or preferably an excess of the glycol, about one equivalent, or preferably an excess of the orthoester, and at least 1 gram of the solid catalyst per equivalent of ketone, preferably 10 or more grams of solid catalyst per equivalent of ketone. The reaction is optionally conducted in the presence of an inert solvent. Since the catalyst is easily removed by filtration for reuse, large excesses of the solid may be conveniently employed.

The reaction is conducted at a temperature of from about 25° C. to about the boiling point (b.p.) of the orthoester used, but preferably at a temperature below the boiling point of the orthoester but above the boiling point of the orthoester reaction products. For example, a reaction temperature of from about 65° C. to 95° C. is suitable when using trimethyl orthoformate (b.p.=102° C.), the reaction products of which are methanol (b.p.=65° C.) and methyl formate (b.p.=34° C.). It is apparent that the reaction temperature can be adjusted appropriately when conducting the reaction under reduced or elevated pressures.

The most preferred ketal monomer is preferably prepared by heating a mixture of 4,4'-dihydroxybenzophenone, excess glycol, excess trialkyl orthoformate, and from about 0.1 to about 5 grams of montmorillonite clay per gram of ketone and, preferably, from about 0.5 to about 2.5 grams of clay per gram of ketone, so as to distill off the alcohol derived from the orthoformate. The ketal, 2,2-bis(4-hydroxyphenyl)-1,3-dioxolane, can be obtained in excellent yield (60% to almost quantitative) in less than 48 hours reaction time.

Standard isolation methods can be employed to recover the ketal monomer and unreacted ketone, if any, with due care to avoid acidic aqueous environments. In some cases recrystallization or other extensive purification of the isolated reaction product may be unnecessary prior to use in the process to prepare a polyketal. Thus, for example, after dilution of the reaction with ethyl acetate solvent, filtration to remove the solid catalyst, extraction of the solution with basic water to remove excess glycol, drying with a conventional drying agent such as anhydrous sodium sulfate, removal of the solvent and volatile materials under vacuum, and then washing the resulting solid with a solvent such as methylene chloride to remove minor contaminants, a reaction product is obtained which contains primarily ketal bisphenol monomer but may still contain some unreacted ketone precursor. This reaction product may be used without further purification to prepare high molecular weight polyketal.

In general the reaction conditions employed to prepare the polyketals are those used for effecting polymerization of bisphenols with bishalobenzenoid compounds or of halophenols for the preparation of polyarylethers.

The preparation of the polyketals is conducted in the presence of a base in a dipolar aprotic solvent, and preferably in the presence of an inert azeotropic agent, at temperatures above about 100° C.

The base which may be used is one capable of reacting with the aromatic hydroxyls of the bisphenol or halophenol monomers to form the mono or disalts thereof. Alkali metal carbonates, bicarbonates, hydroxides, and mixtures thereof, are commonly used in near stoichiometric amounts or in excess. Although the mono or disalts can often be formed separately and isolated for the polymerization reaction, it is usually preferable to react the hydroxyl monomers with the base in situ either prior to addition of the bishalobenzenoid monomer or during the polymerization step in the presence of the bishalobenzenoid monomer. In the latter case the alkali metal carbonates and mixtures thereof are particularly useful.

The dipolar aprotic solvents commonly used include dialkylamides such as dimethylformamide and dimethylacetamide; cyclicalkylamides such as N-methylpyrrolidinone and N-propylpyrrolidinone, acyclic and cyclic ureas such as N,N'-dimethylpropyleneurea and 1,2-dimethyl-2-imidazolidinone; dialkyl and diaryl sulfoxides such as dimethyl sulfoxide; dialkyl, diaryl, and cyclic sulfones such as dimethyl sulfone, diphenyl sulfone, and sulfolane; sulfamides and phosphoramides, such as N,N,N',N'-tetraethyl sulfamide and hexamethyl phosphoramide, and the like. Generally, the lower boiling solvents (b.p. <290° C.) are preferred.

The azeotropic agent used to remove the water of reaction or water introduced into the reaction is generally any inert compound which does not substantially interfere with the polymerization, codistills with water, and boils between about 25° and about 250° C. Common azeotropic agents include benzene, toluene, xylene, chlorobenzene, methylene chloride, dichlorobenzene, trichloro-benzene, and the like. It is advantageous, of course, to select the azeotropic agent such that its boiling point is less than that of the dipolar solvent used. Although an azeotropic agent is commonly used, it is not always necessary when higher reaction temperatures, for example, above 200° C., are employed especially when the reaction mixture is continuously sparged with inert gas.

It is generally desirable to conduct the reaction in the absence of oxygen under an inert atmosphere.

The reaction can be carried out at atmospheric, subatmospheric, or superatmospheric pressures.

Other catalysts, salts, diluents, processing aids, additives, and the like may also be present or added during the reaction provided they do not substantially interfere with the polymerization reaction, either directly or indirectly.

Reaction temperatures of up to about 250° C. are generally sufficient for the polymerization reaction although higher temperatures can be used if necessary. The temperature will depend, of course, on the solvent boiling point and the reaction pressure and will also affect the reaction rate. In general, under atmospheric conditions, the reaction temperature will be from about 100° C. to about 165° C. in dimethylacetamide; to about 240° C. in sulfolane; and to about 200° C. in N-methylpyrrolidinone.

Obviously, the reaction solvent, the base, and the reaction temperature should be selected so as to obtain a reasonable polymerization rate and also to avoid degradation of the solvent, monomers or polymers which may cause interference with the polymerization. It is also preferable, of course, to select the reaction solvent and reaction temperature so as to maintain the growing polymer chain in solution.

Once the desired polymer molecular weight is achieved, the phenate end groups can optionally be reacted by introducing an end-capping reagent, such as methyl chloride to form the stable methyl ether end group, or alternatively, to form other reactive or stable end groups, as desired.

The preferred reaction conditions using the preferred monomers involve reacting, under argon or nitrogen atmosphere, essentially stoichiometric amounts of the monomers in the presence of from about 1 to about 50 percent excess of dried potassium carbonate in dimethylacetamide (or sulfolane) with toluene (or chlorobenzene) azeotrope at about 115° C. (or 160° C.) initially under reflux of the azeotropic solvent, gradually increasing the reaction temperature from about 155° to about 165° C. (or from about 180° to about 220° C.) by allowing some toluene (or chlorobenzene) to distill. The reaction is held at this temperature until the desired molecular weight polymer is formed, usually in about 0.5 to about 8 hours. The reaction is diluted with dimethylacetamide (or sulfolane or other suitable solvent) and cooled to about 100° to about 150° C. Methyl chloride or other suitable end-capping agent is then sparged through the reaction mixture for about 0.2 to about 2 hours to end-cap the polymer.

Commonly practiced polymer recovery methods can be used, such as coagulation into water or an organic (non)solvent; the recovered polymer is optionally washed with water and alcohol or other solvents and dried. Other recovery methods such as extraction, filtration, devolatilization, and the like, may also be used.

The second step of the process of this invention, i.e., the conversion of polyketals to the polyarylether ketones, is conducted by heating the polyketal in the presence of a Group IIA, IIB, IVA, IIIB, IIIA, IVB, IB, and VIII metal salt.

Admixture of the polyketal with the said metal salt can be accomplished by several methods, including for example (1) the preparation of a solution of ketal with metal salt in a volatile organic solvent and subsequent evaporation of the solvent and (2) mechanical mixing at temperatures above the Tg of the polyketal, as for example in an extruder.

The metal salts employed in this invention may be characterized as Lewis acids. However, I have found, as shown by the Examples, that the strong Lewis acids, exemplified for example by $AlCl_3$, $FeCl_3$, and $TiCl_4$ while effective for conversion of the polymeric ketal to ketone functionality, also result in additional degradation of the polymer, which is detrimental to the properties of the final poly(aryl ether ketone). The effective metal salts of this invention are characteristically the weaker Lewis acids and are, surprisingly, very effective in accomplishing the desired conversion without inducing additional undesired reactions.

EXAMPLES

The following examples serve to give specific illustrations of the practice of this invention but they are not intended in any way to limit the scope of this invention.

PREPARATION OF POLYKETAL

A 500 ml 4-neck reaction flask fitted with a mechanical stirrer, thermometer, argon inlet, jacketed Vigreaux column, Dean-Stark trap and condenser was charged with 23.16 gm of 2,2-bis(4-hydroxyphenyl)-1,3-dioxolane (97.95 percent ketal and 2.05 percent of 4,4'-dihydroxybenzophenone by vpc analysis, 90.03 mmoles total monomers), 19.64 gm of 4,4'-difluorobenzophenone (90.03 mmole), 160 ml of dried dimethylacetamide, 115 ml of toluene, and 18.68 gm of dried, anhydrous potassium carbonate. The reaction mixture was stirred as purged with argon for one hour, heated to reflux in an oil bath, and the reflux temperature was gradually increased from 119° to 150° C. by removing distillate from the trap and adding small amounts of toluene to the reaction flask. After about 5.5 hours, a solution of 0.02 gm of 4,4'-difluorobenzophenone in 2 ml of dimethylacetamide was added to the viscous reaction mixture to assure stoichiometry. After an additional 30 minutes, the heating bath was removed and 135 ml dimethylacetamide added to dilute the reaction.

The reaction temperature was then adjusted to 110° C. and methyl chloride gas was bubbled through the reaction mixture for about one hour (using the argon inlet tube) to end-cap the phenate end-groups, during which the yellow-green reaction mixture changed to a creamy beige color. The reaction mixture was then heated to 150° C. and filtered through a sintered glass funnel. The filtrate was coagulated into excess isopropanol and the polymer washed with ispropanol, distilled water, and methanol and dried under vacuum at 100° C. to give 35.5 gm of polymer ( 89.8 percent isolated yield). The RV of the polymer was 0.80 in chloroform (0.2 percent, 25° C.) and 1.64 in concentrated sulfuric acid (1 percent, 25° C.).

The polymer was molded at 250° C. to give a clear, tough plaque with excellent color with the following mechanical properties:

| | |
|---|---|
| Tensile modulus (ASTM D-638) | 280,000 psi |
| Tensile strength (ASTM D-638) | 9,520 psi |
| Yield strength (ASTM D-638) | 8,800 psi |
| Yield elongation (ASTM D-638) | 5.0% |
| Elongation at break (ASTM D-638) | 115% |
| Pendulum impact strength — (ASTM D-256) | > 250 ft-lbs/in$^3$ |
| Glass transition temperature | 155° C. |

The polymer was amorphous, i.e., exhibited no melting transition by differential scanning calorimetry.

The amorphous ketal polymer prepared, as described above, was dissolved in 82.7 gm of chloroform. Suspensions of the catalysts were prepared by weighing polymer solution and catalyst into vials so as to give 10 parts polymer to 1 part catalyst (by weight). The suspension were stirred (magnetic stir bar) and then poured into aluminum pans (5 gm suspension). After initial evaporation of the solvent under ambient conditions, the films were dried in the vacuum oven at 60° C. and then at 120° C. The films were heated to higher temperatures to effect conversion to poly(aryl ether ketone).

The results are shown in the Table.

TABLE

| | | | Total Percent Weight Loss at Selected Temperatures | | | | | |
|---|---|---|---|---|---|---|---|---|
| EXAMPLE | TEMP (°C.) | CATALYST | 0 min* | 1 min | 5 min | 10 min | 20 min | 30 min |
| A | 425 | None | 1.2 | 2.9 | 6.8 | 8.2 | 9.8 | 10.2 |
| D | | AlCl$_3$ | 9.5 | 10.2 | 10.5 | 10.6 | 10.8 | 11.0 |
| E | | FeCl$_3$ | 7.0 | 8.1 | 9.2 | 9.6 | 10.0 | 10.3 |
| B | 350 | None | 1.2 | 1.4 | 1.6 | 1.8 | 2.1 | 2.3 |
| 1 | | ZnCl$_2$ | 9.6 | 10.2 | 10.6 | 11.0 | 11.4 | 11.6 |

TABLE-continued

| | | | Total Percent Weight Loss at Selected Temperatures | | | | | |
|---|---|---|---|---|---|---|---|---|
| EXAMPLE | TEMP (°C.) | CATALYST | 0 min* | 1 min | 5 min | 10 min | 20 min | 30 min |
| 2 | | SnCl$_2$ | 7.0 | 8.0 | 8.2 | 8.2 | 8.2 | — |
| 3 | | MgCl$_2$ | 9.0 | 11.3 | 12.5 | 12.8 | 13.0 | 13.1 |
| F | | AlCl$_3$ | 5.4 | 7.0 | 9.2 | 10.0 | 10.6 | 10.8 |
| C | 300 | None | 1.0 | 1.2 | 1.3 | 1.4 | 1.4 | 1.4 |
| 4 | | ZnCl$_2$ | 6.0 | 9.6 | 9.9 | 10.1 | 10.3 | 10.4 |
| 5 | | SnCl$_2$ | 2.5 | 6.9 | 7.9 | 8.4 | 8.9 | 9.2 |
| 6 | | MgCl$_2$ | 5.5 | 8.1 | 8.9 | 9.3 | 9.8 | 10.2 |

*Weight loss (total) at 0 minutes includes loss of residual solvent (normally 1.2%)

Example A shows that at 425° C. the polyketal requires 30 minutes to lose 10.2% by weight which is essentially the theoretical loss for conversion of the ketal groups to carboxyls. The weight loss after 30 minutes was extremely slow, indicative of substantially no additional chemical reaction.

Examples B and C show that, in the absence of weak Lewis acid metal salts, the thermal conversion of polyketal to polyketone was negligible at 300° or 350° C.

Examples 1 and 4 show that complete conversion of the polyketal was accomplished in the presence of ZnCl$_2$ at 350° or 300° within 1 minute and 10 minutes, respectively. After this conversion was complete, very little additional weight loss was observed, indicating little or no additional polymer degradation. The polyketone obtained from Example 1 exhibited a crystalline melting point of 340° C.

Examples 2 and 5 show that in the presence of SnCl$_2$ the conversion is enhanced compared to Examples B and C. Likewise for Examples 3 and 6 with MgCl$_2$, especially at 350° C.

Examples D, E and F show that, although the strong Lewis acid nominally effects conversion of polyketal to polyketone, these metal salts also cause undesired reactions as evidenced by brittleness of polymer films and discoloration.

What is claimed is:

1. A process for preparing a polyaryletherketone which comprises converting a polyketal to the corresponding polyaryletherketone in the presence of a catalyst comprising one or more of a Group IIA, IIB, IVA, VIIB, IIIA, IVB, IB or VIII metal salt.

2. A process as defined in claim 1 wherein the catalyst is a Lewis acid salt of zinc, magnesium or tin.

3. A process as defined in claims 1 or 2 wherein the process is carried out at a temperature of from about 150° to about 400° C.

4. A process for the preparation of a polyaryletherketone which comprises the steps of:
   (a) preparing a polyketal from a compound of the formula:

HO—K'—OH or

HO—L'—X where K' is the residue of a aromatic or heteroaromatic nucleus containing from about 10 to about 40 carbon atoms and also containing at least one difunctional backbone unit of the following formula:

said unit stable to the basic polymerization conditions employed, wherein G and G' are selected from the group consisting of —OR, and —OCOR$^1$, where R and R$^1$ are each independently alkyl, aryl, or arylalkyl radicals of from 1 to about 20 carbon atoms; R and R$^1$ may be may contain heteroatoms, and may also be connected by a chemical bond thus connecting G and G', L' is the residue of a aromatic or heteroaromatic nucleus of from about 10 to about 40 carbon atoms containing at least one electron-withdrawing group situated ortho or para to X and also containing at least one difunctional backbone unit —C(G)(G')— as defined above and X is a group displaced during the polymerization reaction of HO—L'—X;
   by reacting (1) either HO—K'—OH or HO—L'—X with one or more monomers X—Z—Y, (2) HO—L'—X with itself, or (3) HO—K'—OH with HO—L'—X and X—Z—Y, where Z is the residue of a aromatic or heteroaromatic nucleus of from about 5 to about 30 carbon atoms containing at least one electron-withdrawing group ortho or para to X and Y, which X and Y are groups displaced during the polymerization reaction, and
   (b) converting the polyketal to a polyaryletherketone in the presence of a catalyst comprising a Group IIA, IIB, IVA, VIIB, IIIA, IVB, IB or VIII metal salt.

5. A process as defined in claim 4 wherein in

X—Z—Y

Z is selected from the group consisting of

and

where Ar$^{3-6}$ are aryl radicals of from about 5 to about 18 carbon atoms, n is 0 to about 3, Q and Q' are electron withdrawing groups ortho or para to X and Y, selected from the group consisting of —SO$_2$—, —CO—, —SO—, —N=N—, —CH=N—, —CH=N(O)—, —CO—NH—CO—, —CH=HC—, —CH=C(CN)—, —CF$_2$—CF$_2$—, —P(O)R$^8$—, where R$^8$ is a hydrocarbon group, =C=CH$_2$, =C=CF$_2$, and =C=CCl$_2$, and Q" is an electron withdrawing group ortho or para to X and Y selected from the group consisting of —NO₂, —CN, perfluoroalkyl, and hetero nitrogen, and wherein the displaceable leaving groups X and Y are halogen, —OSOR⁸, or —OSO₂R⁸, where R⁸ is a hydrocarbon group.

6. A process as defined in claim 4 wherein in

HO—K'—OH

K' is selected from the group consisting of:

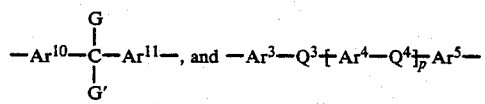

where G and G' are as defined above in claim 4, where p is an integer of from 1 to about 5 Ar³⁻⁵ are aryl radicals of from about 5 to about 18 carbon atoms, Q³ and Q⁴ are electron withdrawing groups ortho or para to X and Y, selected from the group consisting of —SO₂—, —CO—, —SO—, —N=N—, —CH=N—, —CH=N(O)—, —CO—NH—CO—, —CH=CH—, —CH=C(CN)—, —CF₂—CF₂—, —P(O)R⁸— where R⁸ is a hydrocarbon group, =C=CH₂, =C=CF₂, =C=CCl₂, a single bond, —O—, —S—, —S—S— and difunctional hydrocarbon radicals of from 1 to about 20 carbon atoms, with the proviso that at least one Q³ and Q⁴ is the group —C(G)(G')—, and Ar¹⁰ and Ar¹¹ are aryl radicals of from about 5 to about 18 carbon atoms.

7. A process as defined in claim 5 wherein in step (a) the reacting compounds further comprise one or more bisphenols HO—W—OH, where W is selected from the group consisting of

where Ar³⁻⁵ and Ar⁷⁻⁹ are aryl radicals of from about 5 to about 18 carbon atoms, n is 0 to about 3, Q and Q' are radicals selected from the group consisting of —SO₂—, —CO—, —SO—, —N=N—, —CH=N—, —CH=N(O)—, —CO—NH—CO—, —CH=CH—, —CH=C(CN)—, —CF₂—CF₂—, —P(O)R⁸ — where R⁸ is a hydrocarbon group, —C=CH₂, —C=CF₂, —C=CCl₂, and wherein V is a single bond, —O—, —S—, —S—S— or a difunctional hydrocarbon radical of from 1 to about 20 carbon atoms.

8. A process as defined in claim 7 wherein in

HO—W—OH

W is selected from the group consisting of:

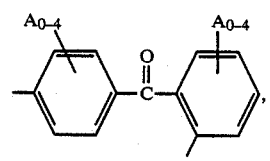

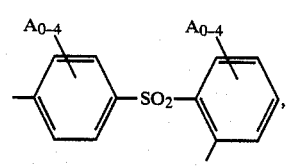

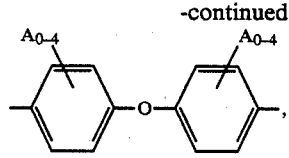

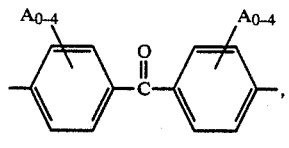

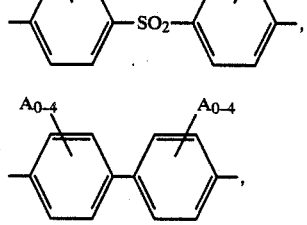

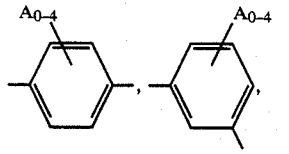

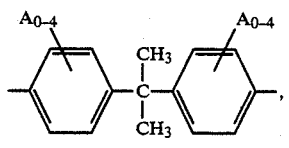

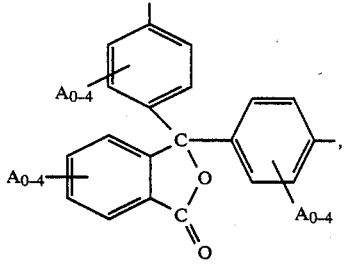

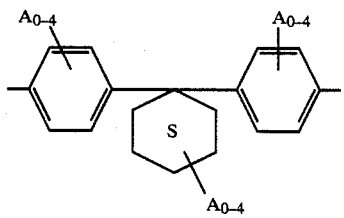

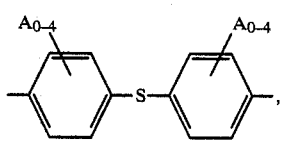

and isomers thereof, where A is a non-interfering substituent group unreactive under the conditions of polymerization and independently selected from the group consisting of hydrogen, alkyl, aryl, halogen, and cyano.

9. A process as defined in claim 4 wherein HO—L'—X is selected from the group consisting of:

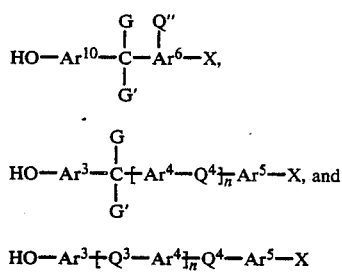

where G, and G' are as defined above in claim 4, $Ar^{3-6}$ and $Ar^{10}$ are aryl radicals of from about 5 to about 18 carbon atoms, Q" is an electron withdrawing group ortho or para to X selected from the group consisting of —$NO_2$, —CN, perfluoroalkyl, and hetero nitrogen, $Q^3$ and $Q^4$ are radicals selected from the group consisting of —$SO_2$—, —CO—, —SO—, —N=N—, —CH=N—, —CH=N(O)—, —CO—NH—CO—, —CH=CH—, —CH=C(CN)—, —$CF_2$—$CF_2$—, —P(O)$R^8$— where $R^8$ is a hydrocarbon group, =C=$CH_2$, =C=$CF_2$, =C=$CCl_2$, a single bond, —O—, —S—, —S—S— and difunctional hydrocarbon radicals of from 1 to about 20 carbon atoms, $Q^4$ is as defined above with the proviso that at least one $Q^4$ is ortho or para to X, $Q^3$ is as defined above with the proviso that at least one $Q^3$ is —C(G)(G')—, and n is 1 to about 5, and wherein X is halogen or nitro.

10. A process as defined in claim 5 wherein in

X—Z—Y

Z is selected from the group consisting of:

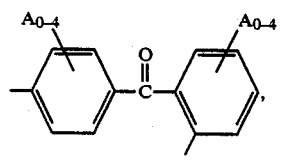

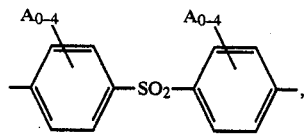

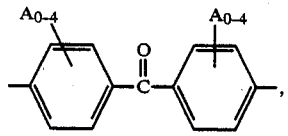

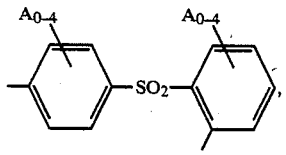

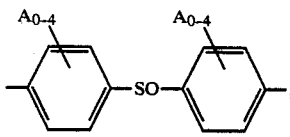

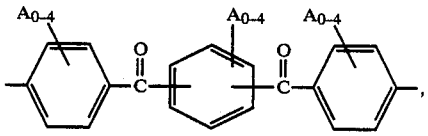

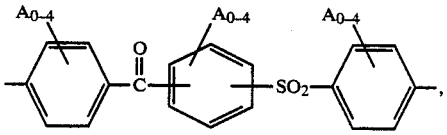

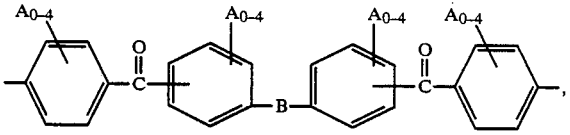

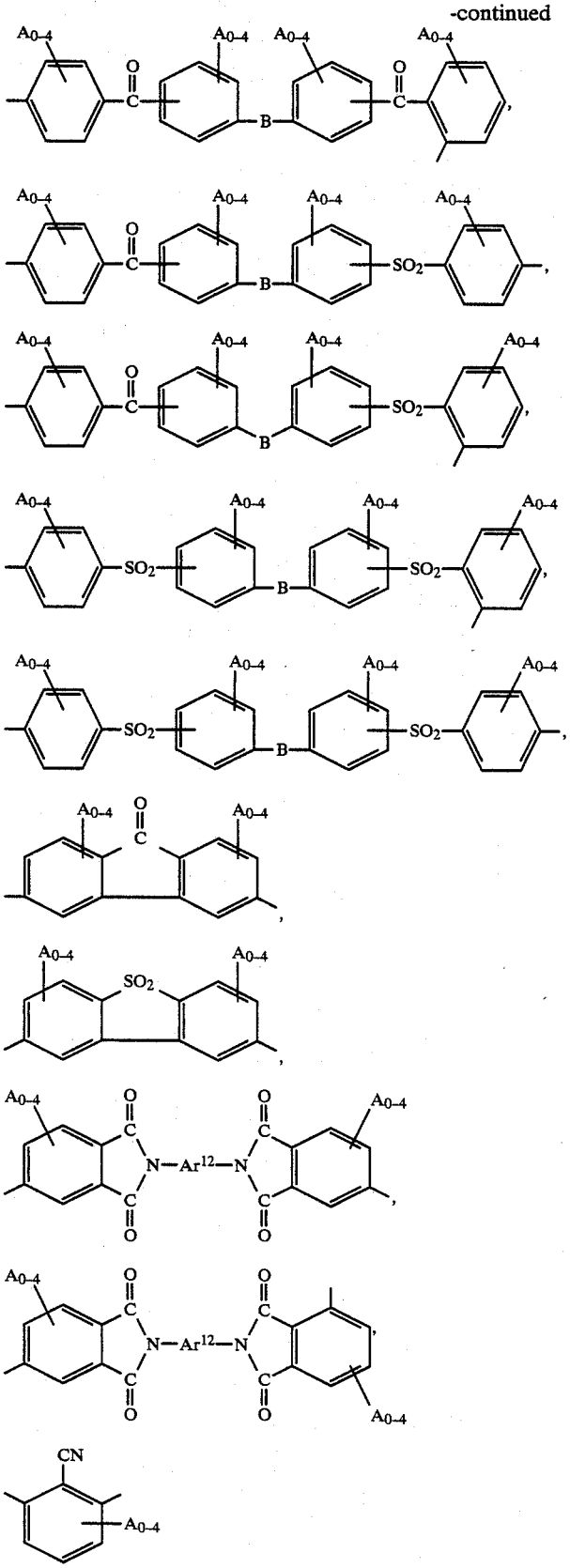
and isomers thereof, $Ar^{12}$ is a aryl radical of from about 5 to about 18 carbon atoms, A is a non-interfering substituent group unreactive under the polymerization conditions and independently selected from the group consisting of hydrogen, alkyl, aryl, halogen, and cyano, B is selected from the group consisting of —SO₂—, —CO—, —SO—, —N=N—, —CH=N—, —CH=N(O)—, —CO—NH—CO—, —CH=CH—, —CH=C(CN)—, —CF₂—CF₂—, —P(O)R⁸— where R⁸ is a hydrocarbon group, =C=CH₂, =C=CF₂, =C=CCl₂, a single bond, —O—, —S—, —S—S— and difunctional hydrocarbon radicals of from 1 to about 20 carbon atoms, and wherein X and Y are halogen or nitro.

11. A process as defined in claim 9 wherein HO—L'—X is selected from the group consisting of:

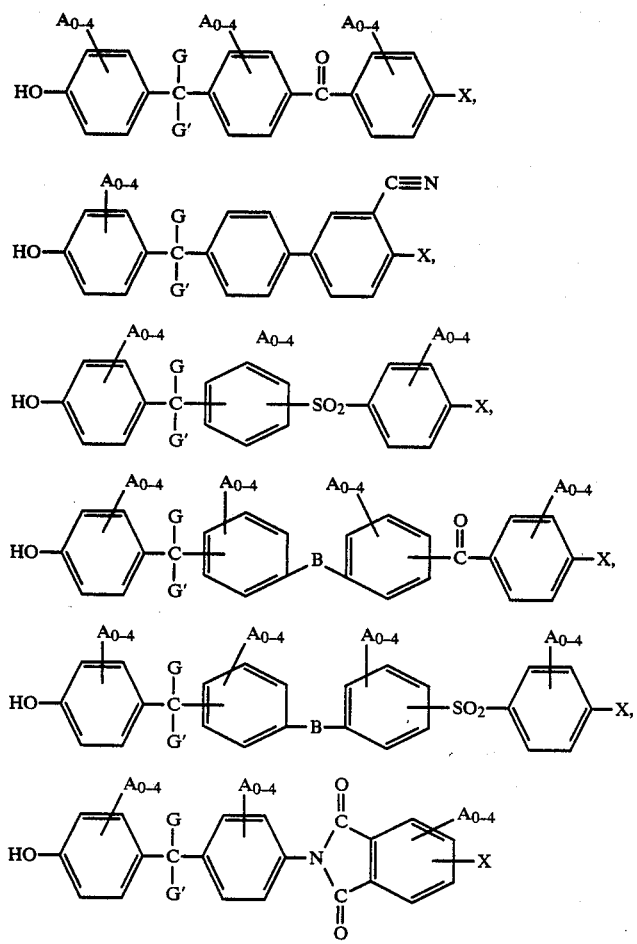

and isomers thereof, where A is a non-interfering substituent group selected from the group consisting of hydrogen, alkyl, aryl, halogen, and cyano, B is selected from the group consisting of —SO₂—, —CO—, —SO—, —N=N—, —CH=N—, —CH=N(O)—, —CO—NH—CO—, —CH=CH—, —CH=C(CN)—, —CF₂—CF₂—, —P(O)R⁸— where R⁸ is a hydrocarbon group, =C=CH₂, =C=CF₂, =C=CCl₂ a single bond, —O—, —S—, —S—S— and difunctional hydrocarbon radicals of from 1 to about 20 carbon atoms, G and G' are —OR where R is a alkyl, aryl, arylalkyl of from 1 to about 20 carbon atoms and may contain heteroatoms or other non-interfering functional groups with the proviso that R not contain functionality which is base sensitive, such as hydroxyl, and G and G' may be the same or different and connected or unconnected, and wherein X is F, Cl, or NO₂.

12. A process as defined in claim 6 wherein in

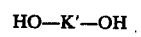

K' is selected from the group consisting of:

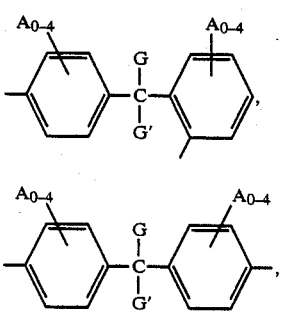

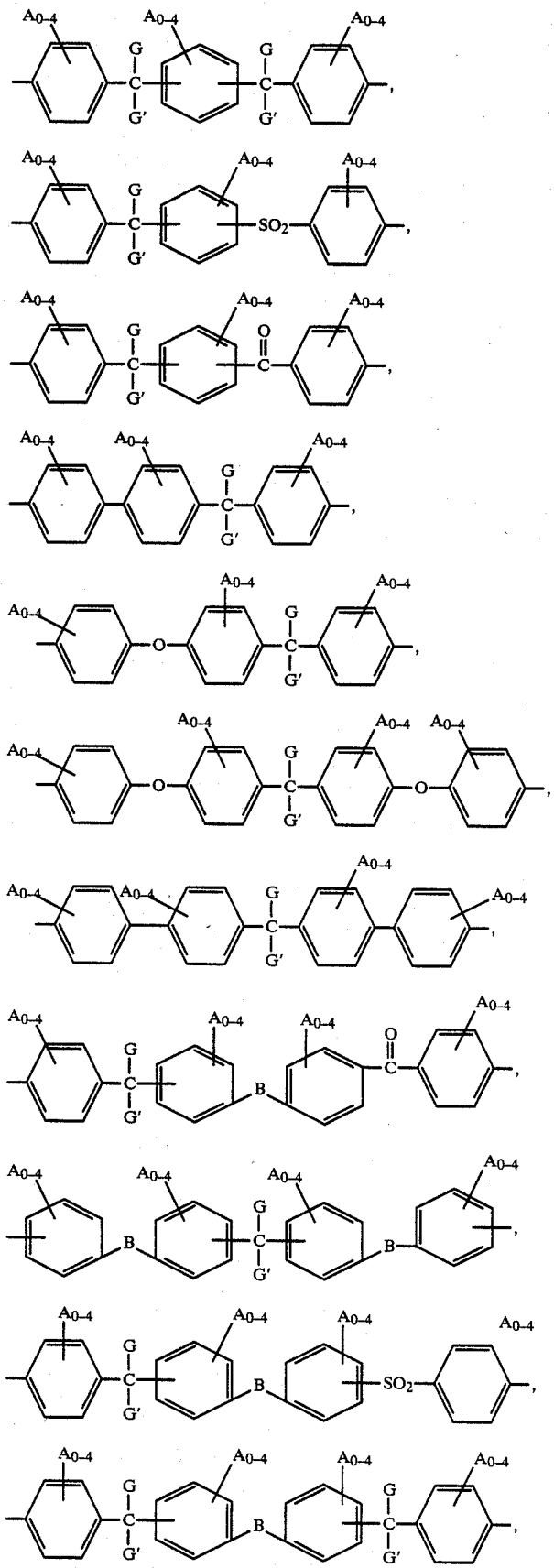

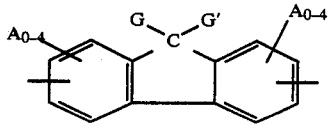

and isomers thereof, where A is a non-interfering substituent group selected from the group consisting of hydrogen, alkyl, aryl, halogen, and cyano, B is selected from the group consisting of —SO$_2$—, —CO—, —SO—, —N=N—, —CH=N—, —CH=N(O)—, —CO—NH—CO—, —CH=CH—, —CH=C(CN)—, —CF$_2$—CF$_2$—, —P(O)R$^8$— where R$^8$ *is a hydrocarbon group*, =C=CH$_2$, =C=CF$_2$, =C=CCl$_2$, a single bond, —O—, —S—, —S—S— and difunctional hydrocarbon radicals of from 1 to about 20 carbon atoms.

13. A process as defined in claim 10 wherein Z is selected from the group consisting of:

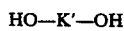

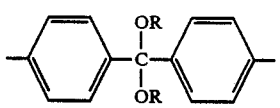

and wherein X and Y are F or Cl.

14. A process as defined in claim 12 wherein K' is selected from the group consisting of

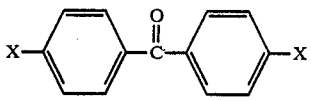

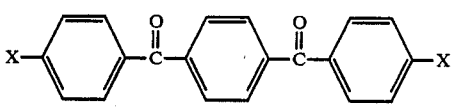

-continued

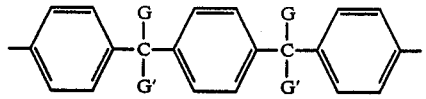

wherein G and G' are OR, where R is a alkyl, aryl, or aryl-alkyl of from 1 to about 20 carbon atoms and may contain heteroatoms or other non-interfering functional groups with the proviso that R should not contain functionality which is base sensitive such as hydroxyl, and G and G' may be the same or different and connected or unconnected.

15. A process as defined in claim 4 wherein in

HO—K'—OH

K' is where R is a alkyl, aryl, or aryl-alkyl of from 1 to about 20 carbon atoms and may contain heteroatoms or other noninterfering functional groups with the proviso that R should not contain functionality which is base sensitive and that R groups may be the same or different and connected or unconnected, and wherein the monomer X—Z—Y is selected from the group consisting of where X and Y are the same and selected from the group consisting of F, Cl, or NO$_2$.

16. A process as defined in claim 4 wherein the catalyst in step (b) is a Lewis acid salt of zinc, magnesium, or tin.

17. A process as defined in claim 16 wherein the catalyst is ZnCl$_2$, MgCl$_2$ or SnCl$_2$.

* * * * *